United States Patent [19]

Kelley et al.

[11] 3,902,164

[45] Aug. 26, 1975

[54] METHOD AND MEANS FOR REDUCING THE AMOUNT OF ADDRESS TRANSLATION IN A VIRTUAL MEMORY DATA PROCESSING SYSTEM

[75] Inventors: Warren J. Kelley, Berkshire; Lawrence E. Larson, Vestal, both of N.Y.

[73] Assignee: International Business Machines Corporation, Armonk, N.Y.

[22] Filed: Nov. 30, 1973

[21] Appl. No.: 420,508

Related U.S. Application Data

[63] Continuation of Ser. No. 274,040, July 21, 1972.

[52] U.S. Cl. .............................................. 340/172.5

[51] Int. Cl.$^2$ .............................................. G06F 7/04

[58] Field of Search .................................. 340/172.5

[56] References Cited

UNITED STATES PATENTS

| | | | |
|---|---|---|---|
| 3,317,898 | 5/1967 | Hellerman | 340/172.5 |
| 3,533,075 | 10/1970 | Johnson et al. | 340/172.5 |
| 3,569,938 | 3/1971 | Eden | 340/172.5 |
| 3,573,855 | 4/1971 | Cragon et al. | 340/172.5 |
| 3,693,165 | 9/1972 | Reiley et al. | 340/172.5 |
| 3,723,976 | 3/1973 | Alvarez | 340/172.5 |

*Primary Examiner*—Harvey E. Springborn
*Attorney, Agent, or Firm*—John C. Black

[57] ABSTRACT

In a data processing system including an associative store for rapid translation of recently used virtual page addresses to corresponding real page addresses to access main store, an additional storage means is provided to hold data representative of a boundary in main store below which translation is not required, i.e. the virtual address is used to access this lower part of main store. This lower part of main store is often referred to as the "nucleus"; and selected parts of the "operating system" and selected data are held in this area during normal machine operation. The additional storage means significantly improves system performance with a minimum increment in cost by minimizing the amount of loading and unloading of the associative translation storage means. High frequency of use instructions and data are preferably assigned the virtual addresses below said boundary.

2 Claims, 3 Drawing Figures

METHOD AND MEANS FOR REDUCING THE AMOUNT OF ADDRESS TRANSLATION IN A VIRTUAL MEMORY DATA PROCESSING SYSTEM

This is a continuation of application Ser. No. 274,040 filed July 21, 1972.

BACKGROUND OF THE INVENTION

The present application is directed to the addressing of main or real storage in a data processing system. More particularly, the invention is related to a system wherein virtual addresses are assigned to instructions and data of programs, and their physical location in main storage must be determined before they can be accessed from storage. For purposes of this application, the actual physical location in main storage will be referred to by the terms real address or absolute address.

In multiprogramming environments, the productivity of operating systems levels off because of the need to divide main storage space (into partitions) to run different programs which are part of the operating system and users job stream. An operating system basically controls the execution of those programs and system resources governing scheduling, debugging, input/output control, storage assignments, data management, and related services.

If main storage space is added to meet increased system requirements, expensive reprogramming and system design are required. Virtual storage offers a solution to the main storage constraint problem, and, at the same time, permits increased efficiency of system management.

With virtual storage, programs to be processed in main storage are loaded into a space reserved on direct access storage on disk to represent the virtual storage of the computer. As programs go through execution, the active parts of virtual storage (ready for execution) are assigned to real storage in blocks, or pages. Real, or main storage, is divided into page frames which are the same size as the pages in virtual storage.

Appropriate operating system and hardware features combine to move the pages to be processed out of direct access storage into available real storage, as they are required. Pages of a specific program may be placed in any available space in real storage, regardless of how they are organized in virtual storage. When the real storage space occupied by a page is needed, another page is brought into that space in real storage for execution. Indirect addressing capability of the operating system eliminates the need to "account" for the displaced page because it is still in virtual storage.

When pages are brought into main store, their corresponding real and virtual addresses are stored in tables in main storage; and the most recently used or referenced virtual and corresponding real addresses are also stored in a high speed associative store. Each time that a virtual address is supplied by a processor for addressing main store, a search is first made of the high speed associative store to determine whether or not a rapid virtual-to-real address translation can be made using one of the entries therein. In the event that the desired virtual address is found in the associative store, its corresponding real address is read out and used immediately to access main store. In the event that the desired virtual address and corresponding real address are not found in the associative store, the processor initiates a routine for making a table look-up search through the address tables in main store to locate the desired virtual address and its corresponding real address. In the event that the desired virtual address is found, its corresponding real address is read out for accessing main storage. In the event that no match is found in the main storage tables, a paging supervisor is called upon to find the particular data in disk storage and page the data into real storage.

In a typical environment, a least recently used algorithm is utilized to maintain only the most recently referenced virtual-to-real addresses in the high speed associative store. Thus when no match is found in the associative store and a match is then found in the main store, the virtual and real addresses being searched for are transferred into the storage position of the least recently used real and corresponding virtual addresses. Whenever a valid page in real store is invalidated, the entire associative store is reset for providing space for a new set of virtual and corresponding real addresses of the new program as they become referenced.

A significant amount of processor overhead (processor execution time) is used for loading the tables in main store and the associative store. It is to this particular problem that the present invention is directed.

SUMMARY OF THE INVENTION

In the conventional data processing systems being marketed today, the lower portion (or some other specified area) of main store is reserved for portions of the operating system such as the supervisor. In addition, system queue areas, fixed system data input/output routines, and buffer areas, and even operating system transient areas are also reserved in the lower portion of main store. In addition in systems utilizing the virtual memory concept and translation of virtual addresses to real addresses for accessing main store, it is common to assign a virtual address to information in this lower portion (nucleus) of main store which is equal to the corresponding real address. However, the same address translation process is utilized when addressing this lower portion of main store.

It is the primary object of the present invention to substantially minimize the virtual-to-real address translation overhead associated with this lower portion of main store by eliminating translation below a specified boundary (or within a specified area) and alternatively using the virtual address to access main store.

It has been determined by the present inventors that a substantial proportion of the translation overhead is related to translation of virtual addresses referencing this lower portion of main store. This area includes information having a very high frequency of use. For example, much of the supervisor is a high-frequency-of-use set of instructions. In addition it has been determined by the inventors herein that significant reduction in the loading maintaining of current addresses in the associative registers is effected by making use of the present improvement. This is due in part to the fact that there is now no requirement to load the associative store with any virtual and corresponding real addresses which access this lower area of main store. Frequency of replacement of least recently used addresses is therefore reduced. In addition, reference to certain parts of the lower area caused displacement/replacement of entries in the associative store inducing redundant references to main store page tables.

Hence it was discovered by the inventors that unexpected improvements in the overall performance of the anslation overhead, as high as 15–25%, can be :hieved by the simple expedient of making use of the irtual address to access storage in a selected lower ortion of storage.

In a preferred embodiment of the present invention, hardware register is provided into which is stored the igh order bits of the address of a predetermined oundary in main store below which address translaon will be made. Processor supplied virtual page adresses below this boundary are entered into the storge address register to access main store. When a virıal address is supplied by the processing unit to the as- ɔciative store to determine whether or not virtual adress and its corresponding real address are stored ıerein for the purpose of address translation, the high rder bits virtual address supplied by the processor is ımultaneously compared with the value in the boundry register. In the event that the supplied virtual adress is below the value in the boundary register, the irtual address is gated to the main storage address regıter for accessing the main storage. In such an event, ıe output of the associative store is rendered ineffecıve. However, if the supplied virtual address is equal to r above the boundary value in the register, the assoiative store is operated in a known manner to perform he address translation (supply the real address at its ›utput) in the event that the desired virtual and correponding real addresses are stored therein.

The foregoing and other objects, features and advanages of the invention will be apparent from the followng more particular description of a preferred embodinent of the invention, as illustrated in the accompanyng drawings.

DESCRIPTION OF THE PREFERRED EMBODIMENT

Figure 1:
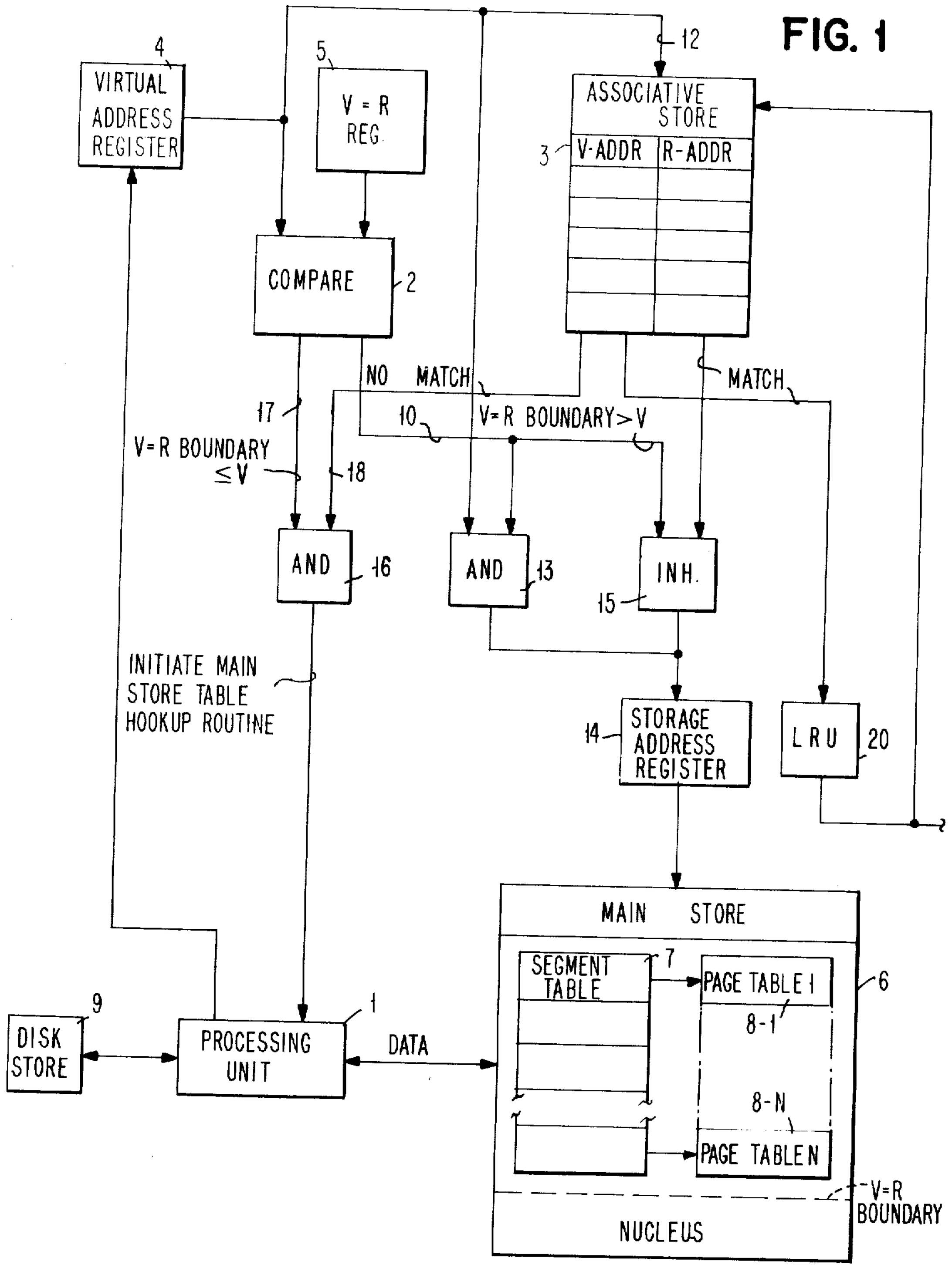
FIG. 1 is a fragmentary diagrammatic illustration of ı system incorporating a preferred embodiment of the mproved address translation mechanism.

The system illustrated partially in FIG. 1 can be any ›ne of several known types, for example that described n greater detail in "Time Sharing in the IBM Sysem/360 Model 67", pages 61–78, Proceedings - Spring loint Computer Conference 1966, or in U.S. Pat. Nos. 3,533,075 or 3,412,382.

When an access to main store 6 of FIG. 1 is required, ›rocessing unit 1 supplies a virtual address to a comɔare unit 2 and a high speed associative store 3, preferıbly by way of a register 4 and a bus 12.

The store 3 includes a plurality of entries. Each valid ɜntry includes a recently used virtual address and its asıociated real address.

A register 5 stores a value equal to the high order bits page value) of the V=R boundary address in main ıtore 6 below which virtual and corresponding real adlresses are equal. For example, if a page is two thouıand bytes, the low order 12 bits of the page address are ıot required in register 5. A segment table 7 and page ables 8-1 to 8-N reside in main store 6. The table 7 has an entry for each of N segments of the virtual memory in a disk store 9. Each entry has an address pointer to the beginning of a respective page table 8-1 to 8-N. Each page table has a plurality of entries for pages of the respective segment which have been paged into main store 6 from the magnetic disk store 9. Each valid page table entry includes a pointer to the beginning of a page in main store 6.

Output 10 from the compare unit 2 activates AND gate 13 to gate the virtual address on bus 12 into a storage address register 14 of main store 6 when the high order bits of the virtual address supplied by processing unit 1 are less than the value in the register 5. Output 10 also applies an inhibit pulse to gate 15 to prevent the transfer of any real address from the store 3 to the register 14 when translation is not required.

AND gate 16 signals the processor 1 to initiate search of tables 7 and 8-1 to 8-N when signals are applied to inputs 17 and 18. Signals are applied to inputs 17 and 18 by compare unit 2 and store 3 when the current virtual address in register 4 is greater than or equal to the boundary value in register 5 and is not found in store 3.

A least recently used (LRU) hardware unit 20 of known design keeps track of the order in which addresses stored in the store 3 have been referenced. The unit 20 identifies the virtual and corresponding real address entry in the associative store 3 which is replaced when a new entry is written into store 3.

In U.S. Pat. No. 3,412,382 there is described in greater detail a conventional method for searching an associative store for rapid address translation, for searching real store segment and page tables for somewhat slower address translation, and finally for paging in the desired data from a disk store when it has not been found to be resident in real store.

Figures 2A, 2B:
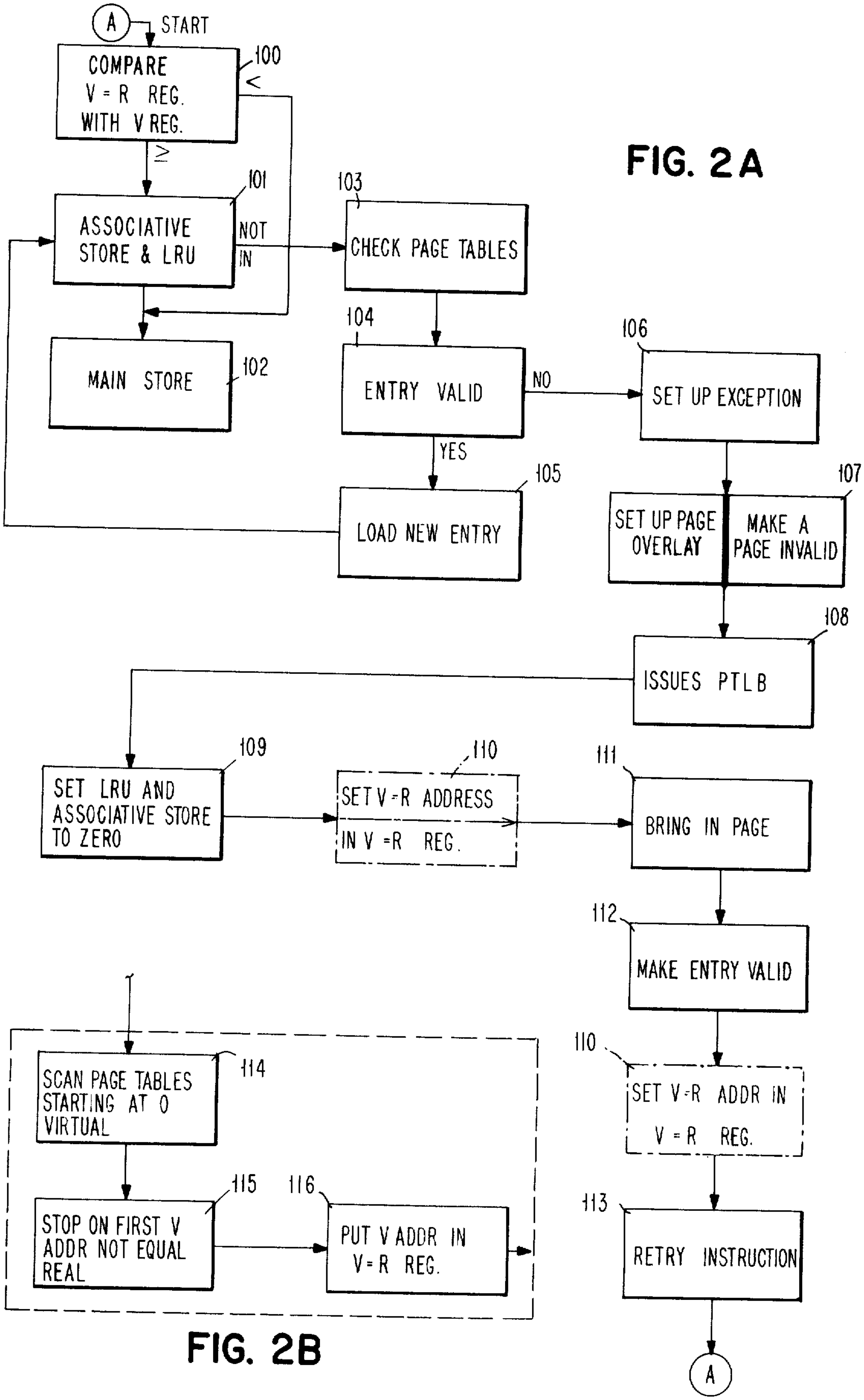
FIG. 2A is a flowchart illustrating a preferred form of he address translation and paging processes including he translation look-up table loading and resetting teps.
FIG. 2B illustrates an alternative method for deriving he value to be set in the boundary register.

Therefore, the flowchart of FIGS. 2*a* and 2*b* will be described only briefly to show the environment in which the improvement of the present application operates.

Steps 100–102 represent the operation of FIG. 1 described above. The virtual address that is supplied by the central processing unit is compared to the value in the V=R registers. If the virtual address is less than the boundary address, main store 6 is accessed with the virtual address. If the virtual address is greater than or equal to the boundary address, the virtual address is used as a search argument input to the associative store 3. The associative array is searched to determine if the array contains the virtual address and its corresponding real address. If the virtual address is found in the associative array, its real address is used to access main store 6. If the virtual address is not in the associative array, control is passed to step 103.

In steps 103, 104 the processor references the paging tables 7 and 8-1 to 8-N in main store 6, for example by way of a microprogram routine, to locate the desired real address in the tables. If the corresponding page is resident in main store, its corresponding real address will be found in one of the tables 8-1 to 8-N. The valid bit in the page table is tested to determine whether the virtual page is valid or not, i.e. is it in main store and available for access by the processor? If the page is not valid, control is transferred to step 106.

In the preferred embodiment, each virtual address includes a segment portion, represented by the highest order bits of the address, a page portion represented by the intermediate order bits, and a word or byte portion represented by the low order bits. The segment portion of the virtual address together with a segment table origin pointer (store in a register, not shown) access the desired entry in table 7. The page portion of the virtual address and the entry read out of table 7 during the search of steps 103, 104 are used to access the desired entry in a selected table 8-1 to 8-N. The output of a selected entry in one of the tables 8-1 to 8-N has the word portion of the virtual address concatenated thereto to form the corresponding real address. This method and the apparatus for performing it is well known in the art.

If the page is valid, control is transferred to step 105 in which the virtual address and real address are loaded into the store 3 under control of the LRU logic 20. Main store can now be accessed by reference to the store 3.

Transfer of control to step 106 terminates hardware processing by storing the virtual address in a predefined location in the nucleus of store 6. Storing the instruction address in low storage terminates the processing of the current instruction. The processor 1 selects a new instruction address from another predefined area and starts the execution of a new instruction string in step 107.

In step 107, a page in main store 6 is selected to be replaced. The contents of the page are made invalid by means of an invalid bit in its page table entry; and an I/O operation is initiated to read into the same area of store 6 where the replacement page is stored. Transfer of control is then made to steps 108 and 109 where a purge table instruction is issued to completely void (reset all of the bit positions to zero) the associative memory 3 to accommodate the invalidation of the page being replaced.

Following step 109 or alternatively following step 112, the preferred embodiment causes the updating of the virtual=real address register 5. This process can be either the retrieving of a predetermined value or a scan of the page tables. If a predetermined value is used, it can be placed into the system at SYSGEN time, or it can be inserted by operator command at system startup time.

The I/O operation required to bring in the required page is completed during step 111; and the real address is stored into the appropriate page table entry and made valid in step 112.

The instruction address stored away during step 106 is reloaded into the processor by load PSW instruction, and processing returns to step 100.

It will be appreciated that other processor work in the multiprogramming environment can be interleaved with the above steps.

Steps 114, 115 represent a microprogrammed loop which begins at virtual address zero in the page tables and does a load real address on that virtual address. That is, the real address is read out and compared with the virtual address for equality. If the virtual address equals the real address, the virtual address is incremented by the page size and the loop tried again to compare the next virtual page table entry address with the real address stored in the entry. This loop continues until the load real address fails (i.e. the real and virtual addresses are not equal), or until the addressing capability of the V=R register is reached.

In step 116, the highest value virtual address developed by steps 114 and 115 is entered into the V=R register as the boundary address in main store 6.

In a typical embodiment, the steps represented at 107, 108, 111, 112 and 113 (and possibly 110) are performed by software instruction routines.

While the invention has been particularly shown and described with reference to a preferred embodiment thereof, it will be understood by those skilled in the art that the foregoing and other changes in form and details may be made therein without departing from the spirit and scope of the invention.

We claim:

1. In a data processing system of the type in which data words are individually assigned virtual addresses from a very large virtual addressing set, and wherein a main memory is addressed by a relatively small set of real addresses, said virtual address set including virtual addresses requiring translation to real addresses prior to their use in accessing main memory, said system including an address translation means which stores recently translated virtual addresses and their corresponding real addresses, the improvement comprising, storage means for storing first data representing a selected group of virtual addresses each of which equals the corresponding real address, comparison means for comparing said first data with each virtual address provided by the processor, and means for disabling said address translation means and for directly using a particular address provided by the processor to address main store when the comparison means determines said particular virtual address is in said selected group.

2. In a data processing system having a main memory, said main memory having a certain number of memory locations, memory addressing apparatus for accessing said memory with a very large set of addresses, said very large set of addresses being larger than said certain number of memory locations, said very large set of addresses including a small set of addresses each of which corresponds to one specific memory location in a small portion of said memory, said memory accessing apparatus including, a memory address register means for storing addresses and for accessing the memory location indicated by the addresses stored therein, first means which provides addresses included in said very large set of addresses, determining means for determining if the addresses provided by said first means are in said small set of addresses, translation means for translating each address which is not a member of said small set of addresses to an address which indicates one of said certain memory locations outside said small portion of memory, means responsive to said determining means for gating the address provided by said first means to said memory address provided by said first means to said memory address register means if said determining means finds that an address is included in said small set of addresses, and means for gating the address provided by said translation means to said memory address register means if the address provided to the first means is not included in said small set of addresses.

* * * * *